United States Patent
Schneider

(10) Patent No.: US 9,249,365 B2
(45) Date of Patent: Feb. 2, 2016

(54) PROCESS FOR GRINDING WAXES USING GRINDING AIDS IN A JET MILL, USE OF POLYOLS AS A GRINDING AID AND WAX POWDER COMPRISING POLYOLS

(75) Inventor: Ulrich Schneider, Heist (DE)

(73) Assignee: Sasol Wax GmbH, Hamburg (DE)

( * ) Notice: Subject to any disclaimer, the term of this patent is extended or adjusted under 35 U.S.C. 154(b) by 152 days.

(21) Appl. No.: 13/989,170

(22) PCT Filed: Nov. 22, 2011

(86) PCT No.: PCT/DE2011/002021
§ 371 (c)(1),
(2), (4) Date: Aug. 16, 2013

(87) PCT Pub. No.: WO2012/069041
PCT Pub. Date: May 31, 2012

(65) Prior Publication Data
US 2013/0323508 A1    Dec. 5, 2013

(30) Foreign Application Priority Data
Nov. 23, 2010 (DE) .......................... 10 2010 052 028

(51) Int. Cl.
*C10G 73/40* (2006.01)
*C08L 91/06* (2006.01)
*B02C 19/06* (2006.01)

(52) U.S. Cl.
CPC ............. *C10G 73/40* (2013.01); *B02C 19/06* (2013.01); *C08L 91/06* (2013.01); *C10G 2300/1022* (2013.01); *Y10T 428/2982* (2015.01)

(58) Field of Classification Search
CPC .......... C10G 73/40; C10G 2300/1022; B02C 19/06; C08L 91/06; Y10T 428/2982
USPC .............................................. 428/402; 241/5
See application file for complete search history.

(56) References Cited

U.S. PATENT DOCUMENTS

| | | | |
|---|---|---|---|
| 3,615,785 A | | 10/1971 | Moorer et al. |
| 4,602,743 A | * | 7/1986 | Nied .................................. 241/5 |
| 5,221,337 A | * | 6/1993 | Luers et al. ................... 106/266 |
| 5,492,563 A | | 2/1996 | Urban |
| 5,743,949 A | * | 4/1998 | Kainz ........................... 106/271 |
| 2004/0057973 A1 | | 3/2004 | Wittkowski et al. |
| 2004/0112995 A1 | | 6/2004 | Harris et al. |
| 2005/0250879 A1 | * | 11/2005 | Correll et al. .................. 523/221 |
| 2008/0287568 A1 | * | 11/2008 | Mathew et al. ................ 523/175 |

FOREIGN PATENT DOCUMENTS

| | | |
|---|---|---|
| CA | 1105502 | 7/1981 |
| CN | 1365991 | 8/2002 |
| CN | 1693343 | 11/2005 |
| CN | 101678396 | 3/2010 |
| DE | 2801702 | 7/1979 |
| DE | 4302619 | 4/1992 |
| DE | 4413848 | 10/1995 |
| EP | 0139279 | 10/1984 |
| JP | 2009001795 | 1/2009 |
| JP | 2010241997 | 10/2010 |

* cited by examiner

Primary Examiner — Leszek Kiliman
(74) Attorney, Agent, or Firm — Bushman Werner, P.C.

(57) ABSTRACT

The subject matter of the present invention is a process for grinding waxes, in particular paraffin waxes using a polyol as a grinding aid in a jet mill, in particular a fluidized bed counter-jet mill, wax powder thus produced containing the grinding aid and the use of the polyols as a grinding aid for waxes.

23 Claims, 1 Drawing Sheet

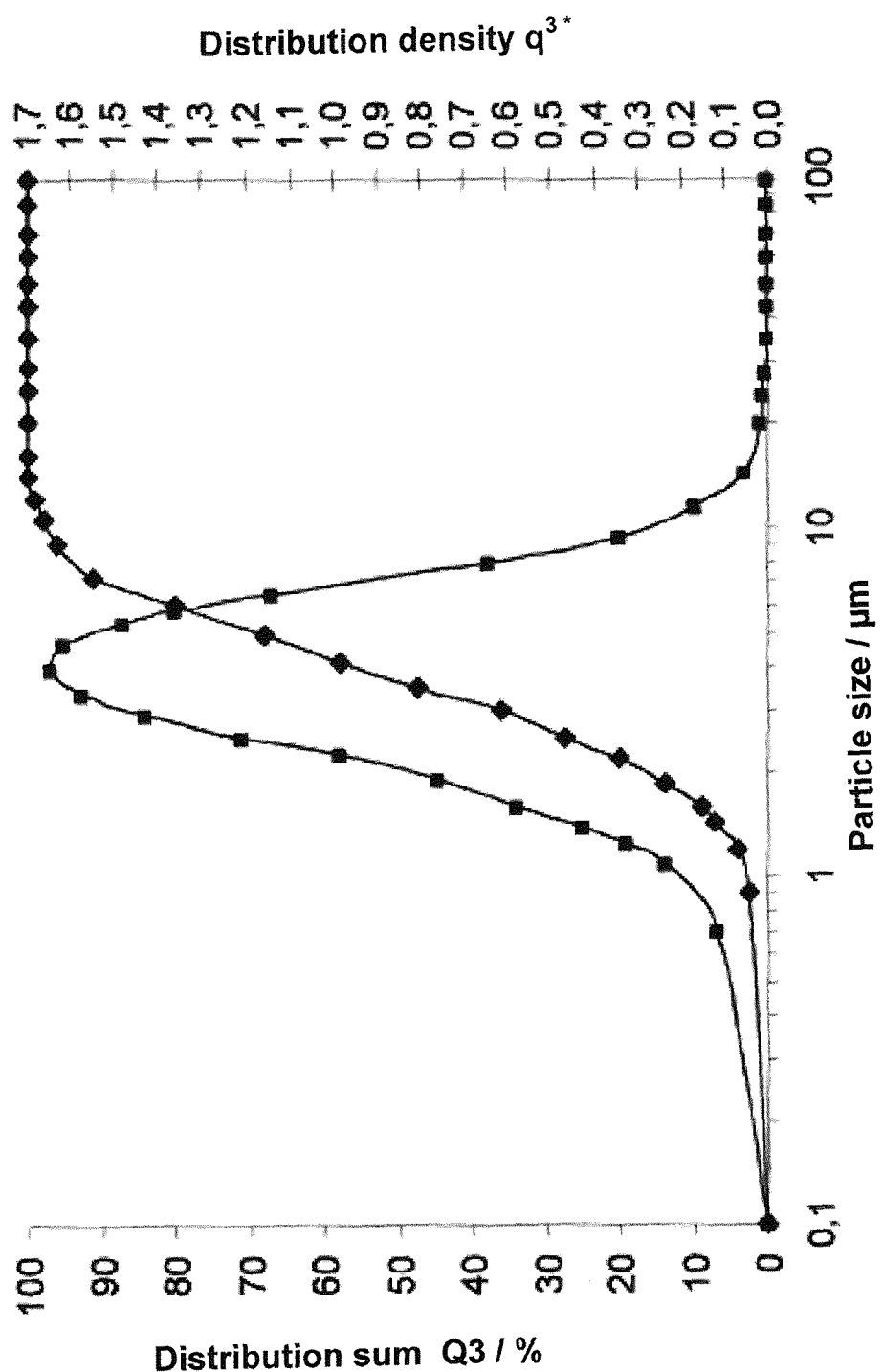

PROCESS FOR GRINDING WAXES USING GRINDING AIDS IN A JET MILL, USE OF POLYOLS AS A GRINDING AID AND WAX POWDER COMPRISING POLYOLS

CROSS REFERENCE TO RELATED APPLICATION

This application is a U.S. National of PCT/DE2011/002021, filed Nov. 22, 2011, which claims priority to German Application No. DE102010052028.4 filed on Nov. 23, 2010, the disclosures of which are incorporated herein by reference for all purposes.

FIELD OF THE INVENTION

The present invention relates to a process for grinding waxes, especially paraffin waxes using a polyol as a grinding aid, especially a fluidized bed counter-jet mill, to wax powders thus produced and to the use of polyols as a grinding aid for waxes.

BACKGROUND OF THE INVENTION

It is known to grind waxes to powder using mills of various designs. It should be noted that as small amount of energy as possible is introduced into the grinding material in order to prevent incipient melting and therefore blocking or adhesion of the grinding material within the grinding chamber or of the product particles to one another. Furthermore, the selection of type of mill also depends on the desired fineness of the grinding material. The coarser the particle size, the more variable the selection is of possible mill machine designs. Waxes that have correspondingly high melting points can be ground at room temperature. If the wax being pulverized does not tolerate the energy input caused by the grinding process without sticking or even melting, the grinding temperature must then be lowered by cooling the mill, the gas transport stream and/or the grinding material from the outside, if necessary also the recycle stream, in order to achieve the desired grinding results.

SUMMARY OF THE INVENTION

The object of the present invention is to provide a process that makes it possible to grind waxes, for example, with congealing points (in each case ASTM D 938-05/DIN ISO 2207:1983) of less than 115° C., in particular less than 110° C., and which produces wax powders having average particle sizes $d_{90}$ (number average) of less than 10 µm, in particular less than 7 µm, in particular without cooling. According to a further definition the average particle sizes $d_{90}$ (number average) are less than 15 µm, in particular less than 10 µm (in each case according to ISO 13320:2009), likewise especially without cooling.

The object is achieved in accordance with the invention by the subject matter of the independent claims. Advantageous refinements of the invention are set forth in the dependent claims and described below.

BRIEF DESCRIPTION OF THE DRAWINGS

FIG. 1 shows a particle size distribution of powder of a Fischer-Tropsch paraffin wax containing trimethylolpropane obtained with the aid of a fluidized bed counter-jet mill.

DETAILED DESCRIPTION OF THE PREFERRED EMBODIMENTS

The present invention makes it possible to grind waxes which heretofore could not be ground or could be ground only with considerable effort in terms of machine cleaning or at very low process temperatures. These can entail petroleum-derived waxes and also synthetic or natural waxes or their modified forms, such as partially oxidized paraffin waxes which are pulverized using a jet mill as a grinding tool.

Waxes are substances that are defined by their mechanical and physical properties. Their chemical composition and origin may widely differ. A substance is referred to as a wax within the meaning of the present invention if it is kneadable and firm at 20° C. and melts without decomposing above 40° C. and becomes slightly liquid above the melting point/slightly viscous. Particularly suitable waxes are waxes with congealing points less than 115° C., in particular congealing points less than 110° C. or even less than 80° C. In particular, the congealing point of waxes is greater than 40° C.

Particularly suitable are hydrocarbon waxes and derivatives thereof, such as partially oxidized hydrocarbon waxes, for example, those having an acid value of less than 30 mg KOH/g. Hydrocarbon waxes comprise, for example, Fischer-Tropsch waxes or paraffin waxes. However, it is also possible according to the invention to grind partially oxidized paraffin waxes or Fischer-Tropsch waxes into powder. Examples of commercial products that are particularly suited for grinding by the process according to the invention are Sasolwax C105, Sasolwax H1, Sasolwax C80 or Sasolwax 7040.

The grinding aid is added to the grinding material either in solid form or during the grinding process in liquid form and remains after the grinding process in the grinding material, or evaporates entirely or partially during the grinding process. If desired, the grinding aid may be subsequently removed, for example by stripping with a stripping gas.

Grinding aids in the form of polyols are used, in particular polyols having 2 to 12, in particular 3 to 7 carbon atoms and, optionally, 1 to 4 ether groups. Polyols within the meaning of the present compound are alcohols having at least two free hydroxy groups, in particular three or four free hydroxyl groups.

Especially preferred are trimethylolpropane, ethylene glycol, diethylene glycol, propylene glycol or trimethylene glycol (1,3-propanediol) or neopentyl glycol. These prevent the adhesion of the grinding material to the walls of the machine as well as the bonding of the particles to one another after the grinding process. The amount of grinding aid added is, depending on the wax to be ground, between 0.01 to 5.0% by weight or 0.1 to 3.0% by weight and in particular 0.2 to 2.5% by weight.

The pulverizing process is carried out preferably with a jet mill, preferably a counter-jet mill and in particular a fluidized bed counter-jet mill. The grinding process is carried out preferably at a temperature of, for example, 10 to 40° C., and in particular normal ambient temperatures of 20 to 30° C.

Jet mills are long known as grinding machines in which the particles to be pulverized are accelerated by jets of gas and are pulverized upon collision. There are a number of jet mill designs. They differ in terms of the type of gas flow, of the type of impact of the particles against each other or on an impact surface and by the fact that the particles to be pulverized are entrained in the gas stream, or whether the gas stream impacts the particles and carries them away. Air is usually used as the grinding gas. Preference is given to counter-jet mills and in particular fluidized bed counter-jet mills.

In the fluidized counter-jet mill, as it is known for example from EP 0139279 A2, gas streams meet one another in a grinding chamber in which the grinding material is in the form of a fluidized bed. Grinding occurs as a result of the grinding material particles colliding against each other, preferably practically exclusively by this means. As a rule, the fluidized bed counter-jet mill is associated with a separator in which the fine product obtained is separated off from insufficiently pulverized coarse material. The coarse material is fed back into the grinding chamber.

The fluidized bed jet mill used according to the invention preferably includes a grinding chamber free of baffles, in the bottom region of which are arranged one or more nozzles. Baffles in the form of impact surfaces may also be provided, however.

The grinding chamber is preferably filled completely with the grinding material to be pulverized to a height that ensures that the grinding material particles collide against each other. Grinding material and gas flow from the grinding material bed in the form of jets at a slower velocity, whereby these jets serve to feed a separator provided above the surface of the material bed and operated independently of the impulse of the jet flowing from the bottom nozzle. When grinding, a number of additional jet nozzles may also be arranged in a circle, approximately at the height of the upper edge of the fill bed, with the axes thereof intersecting at one point.

The invention is described with reference to examples, without being limited to these.

FIG. 1 shows a particle size distribution of powder of a Fischer-Tropsch paraffin wax containing trimethylolpropane obtained with the aid of a fluidized bed counter-jet mill.

Test Description:

A grinding aid in the form of trimethylolpropane together with a Fischer-Tropsch paraffin wax (Sasolwax® C80) consisting of saturated hydrocarbon and exhibiting a congealing point of 78 to 83°, in particular approximately 80° C. were introduced as grinding material into a Hosokawa (AFG 400)-type fluidized bed counter-jet mill. The grinding material and the grinding aid were pre-dosed using a metering screw, such that 1% by weight of trimethylolpropane relative to the mixture of grinding material and grinding aid was ground. With this arrangement, the grinding material, which otherwise tends to cake and clog the mill, was thoroughly ground at room temperature. It was possible to achieve refinements up to $d_{90}$ of 7.5 μm. Clogging of the machine was greatly reduced. The resultant particle size distribution is shown in FIG. 1.

The invention claimed is:

1. A method for grinding waxes for producing wax powders, said method comprising
   providing a wax as grinding material;
   providing at least one polyol as a grinding aid;
   grinding the wax and the at least one polyol in a jet mill until a wax powder is formed, said wax powder having a) an average particle size d50 of less than 10 μm, b) an average particle size d90 of less than 15 μm, or c) both, wherein the polyol is present during the grinding process at 0.01 to 5.0% by weight relative to the total amount of wax powder plus polyol and wherein the wax powder comprises greater than 97.5% by weight of wax and polyol exclusively.

2. The method according to claim 1, characterized in that the jet mill is a counter-jet mill.

3. The method according to claim 1, characterized in that the grinding process takes place at 10 to 40° C.

4. The method according to claim 1, characterized in that the wax is a paraffin wax or Fischer-Tropsch wax.

5. The method according to claim 1, characterized in that the grinding aid is added to the grinding material either as a solid or during the grinding process as a liquid or in liquefied form.

6. The method according to claim 1, characterized in that the at least one polyol has 2 to 12 carbon atoms, 0 to 4 ether groups per molecule, and at least 2 hydroxy groups per molecule.

7. The method according to claim 1, characterized in that the at least one polyol is present during the grinding process at 0.1 to 3.0% by weight, relative to the total amount of wax powder plus polyol.

8. The method according to claim 1, characterized in that the average particle size d50 of the wax powder is less than 7 μm.

9. The method according to claim 1, characterized in that the average particle size d90 of the wax powder is less than 10 μm.

10. A wax powder comprising: 0.01 to 5.0% by weight of at least one polyol, relative to the total amount of wax powder plus polyol, wherein the wax powder comprises greater than 97.5% by weight of wax and polyol exclusively, and wherein the wax powder has a) an average particle size d50 of less than 10 μm, b) an average particle size d90 of less than 15 μm, or c) both.

11. The wax powder according to claim 10, characterized in that the polyol comprises 2 to 12 carbon atoms, 0 to 4 ether groups per molecule, and at least 2 hydroxy groups per molecule.

12. The wax powder according to claim 10, characterized in that the wax powder comprises greater than 98% by weight of wax and polyol exclusively.

13. The wax powder according to claim 10, characterized in that the wax has a congealing point of greater than 40° C. and less than 115° C.

14. The wax powder according to claim 10, characterized in that the average particle size d50 of the wax powder is less than 7 μm.

15. The wax powder according to claim 10, characterized in that the average particle size d90 of the wax powder is less than 10 μm.

16. The method according to claim 2, wherein the jet mill is a fluidized bed counter-jet mill.

17. The method according to claim 6, wherein the at least one polyol has 2 to 12 carbon atoms, 0 to 4 ether groups per molecule, and up to 4 hydroxy groups per molecule.

18. The wax powder according to claim 10, comprising 0.1 to 3.0% by weight of at least one polyol, relative to the total amount of wax powder plus polyol.

19. The wax powder according to claim 10, comprising 0.2 to 2.5% by weight of at least one polyol, relative to the total amount of wax powder plus polyol.

20. The wax powder according to claim 11, wherein the at least one polyol has 2 to 12 carbon atoms, 0 to 4 ether groups per molecule, and up to 4 hydroxy groups per molecule.

21. The wax powder of claim 13 wherein the wax has a congealing point of greater than 40° C. and less than 110° C.

22. The method of claim 1, wherein the polyol has 2 to 12 carbon atoms, optionally one ether group, and at least two free hydroxy groups.

23. The wax powder of claim 10, wherein the polyol has 2 to 12 carbon atoms, optionally one ether group, and at least two free hydroxy groups.

* * * * *